United States Patent
Sano

(10) Patent No.: US 8,437,083 B2
(45) Date of Patent: May 7, 2013

(54) OPTICAL ELEMENT, OPTICAL SYSTEM INCLUDING THE OPTICAL ELEMENT, AND OPTICAL APPARATUS INCLUDING THE OPTICAL SYSTEM

(75) Inventor: Daisuke Sano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 12/783,284

(22) Filed: May 19, 2010

(65) Prior Publication Data

US 2010/0296168 A1     Nov. 25, 2010

(30) Foreign Application Priority Data

May 21, 2009   (JP) ................................. 2009-123181

(51) Int. Cl.
*G02B 1/10*     (2006.01)
(52) U.S. Cl.
USPC .......................................................... 359/581
(58) Field of Classification Search .......... 359/580–581, 359/586
See application file for complete search history.

(56) References Cited

U.S. PATENT DOCUMENTS

2004/0263983 A1 *  12/2004  Acree ........................... 359/586
2005/0074579 A1      4/2005  Suzuki

FOREIGN PATENT DOCUMENTS

| | | |
|---|---|---|
| JP | 61-51283 B | 11/1986 |
| JP | 2003-240904 A | 8/2003 |
| JP | 2003294910 A | 10/2003 |
| JP | 2005-62674 A | 3/2005 |
| JP | 2009015310 A | 1/2009 |
| WO | 2006059686 A1 | 6/2006 |
| WO | 2008001662 A1 | 1/2008 |
| WO | 2008102882 A1 | 8/2008 |

* cited by examiner

*Primary Examiner* — Alessandro Amari
*Assistant Examiner* — Kimberly N Kakalec
(74) *Attorney, Agent, or Firm* — Canon U.S.A., Inc. IP Division

(57) ABSTRACT

An optical element includes a substrate, and an antireflection film provided on a surface of the substrate. The antireflection film is a graded layer having a refractive index that is progressively decreased from the substrate side towards an outer surface of the antireflection film. The graded layer has a reflectivity characteristic occupying ⅔ of a usable wavelength range around the center of the usable wavelength range. Reflectivity of the graded layer at a maximum value of the reflectivity characteristic is a peak value equal to or less than 0.4% The graded layer does not have a maximal value not corresponding to the peak value. At least one of reflectivities at both ends of the usable wavelength range is equal to or less than half the reflectivity at the peak value.

10 Claims, 8 Drawing Sheets

OPTICAL ELEMENT, OPTICAL SYSTEM INCLUDING THE OPTICAL ELEMENT, AND OPTICAL APPARATUS INCLUDING THE OPTICAL SYSTEM

BACKGROUND OF THE INVENTION

1. Field of the Invention

The present invention relates to an optical element, an optical system including the optical element, and an optical apparatus including the optical system, and relates more particularly to optical characteristics of the optical element.

2. Description of the Related Art

When a beam of light impinges on the surface of a transparent material, such as glass, a fraction of the incident light is scattered (reflected) in all directions. The surface roughness of the material is responsible for this loss of energy. Accordingly, a member used in an optical part typically has an antireflection function. A transparent member without an antireflection function has a transmittance that is decreased by about 4% to 8% per surface. Therefore, in a system that uses a plurality of transparent members without an antireflection function, for example, in a photography optical system, the quantity of transmitting light can be markedly decreased.

In order to improve the transmittance of light in transparent optical members, various methods have been suggested to apply an antireflection function. For example, Japanese Examined Patent Application Publication No. 61-51283 suggests a method of applying an antireflection film on a surface of a transparent member. A typical method of forming an antireflection film may be a method of using a film deposition device and forming a film by, for example, vapor deposition or sputtering. However, when such a film deposition device is used, a material for film deposition is limited because with some materials it is difficult to obtain a thin film having a desirable refractive index. Hence, a method has been suggested, in which a thin film having a high refractive index and a thin film having a low refractive index are selectively introduced to properly determine the thickness of a film. With this method, a film virtually having a middle refractive index can be obtained.

Alternatively, an antireflection surface structure ("antireflection structure member") has also been suggested. The antireflection structure member uses a fine structured portion that is smaller than the wavelength of light to be used. One example of this concept is known as the "moth-eye" structure. The surface of the eye of a moth has a very low reflectivity because the eye of a moth has a particular microstructure. Specifically, the cornea surface of a moth's eye is seen to have microscopic raised protuberances in the sub-wavelength range. This sub-wavelength surface-relief profile constitutes a very low reflectance interface for light and appears to absorb light from any direction. Therefore, it has been determined that when light interacts with finely structured portions that are smaller than the wavelength of light, the light does not recognize the structure portions as such and behaves as if the structure portions are formed of a uniform medium. Then, the structure member apparently has a refractive index based on a volume ratio of a material that forms the structure portions. Using this concept, a structure member having a low refractive index, which is not obtained with a normal material, can be provided. Since the material having the low refractive index is used, an antireflection function with higher performance can be obtained.

Japanese Patent Application Laid-Open No. 2005-62674 suggests an antireflection structure member using the above-described microstructure concept. The antireflection structure member includes structure portions each having a shape that is tapered toward the surface. With this shape, it is suggested that a reduced refractive index is gradually decreased from the substrate side toward the surface side.

Japanese Patent Application Laid-Open No. 2003-240904 defines the shape of protrusions of a microstructure. When the shape of a most protruding portion of the protrusions is compared with the shape of a most recessed portion thereof, the shape of the most protruding portion is more tapered. Thus, a change in refractive index at the boundary between the structure and a substrate is decreased, and reflection is decreased.

However, with the concept suggested by Japanese Examined Patent Application Publication No. 61-51283, since the antireflection film uses the material having the high refractive index, the antireflection film may have degraded wide-band characteristics. With the suggestion by Japanese Patent Application Laid-Open No. 2005-62674, although the microstructure is tapered to apply inclination to the refractive index, the document does not disclose a structure having an optimum refractive index. In addition, the document does not disclose a configuration regarding facilitation of fabrication. With the suggestion by Japanese Patent Application Laid-Open No. 2003-240904, an attention is paid only on the change in refractive index at the interface. Thus, a portion with a large change in refractive index may appear, resulting in difficulty of obtaining wide-band characteristics.

SUMMARY OF THE INVENTION

An optical element according to an aspect of the present invention includes a substrate; and an antireflection film provided on a surface of the substrate. The antireflection film is a graded layer having a refractive index that is progressively decreased from the substrate side towards an outer surface of the antireflection film. The graded layer has a reflectivity characteristic occupying ⅔ of a usable wavelength range around the center of the usable wavelength range. Reflectivity of the graded layer at a maximum value of the reflectivity characteristic is a peak value equal to or less than 0.4%. The graded layer does not have a maximal value not corresponding to the peak value. At least one of reflectivities at both ends of the usable wavelength range is equal to or less than half the reflectivity at the peak value.

In the above aspect, an optical thickness d of the graded layer may satisfy a condition in the following expression, $$\frac{(2m+1) - 0.25}{4}\lambda < d < \frac{(2m+1) + 0.30}{4}\lambda,$$

where $\lambda$ is a usable wavelength located within the ⅔ of the usable wavelength range, and m is a natural number.

In the above aspect, a refractive index gradient of the graded layer may satisfy a condition in the following expression, $$\left|\frac{n_\beta - n_{\beta+1}}{n_\beta + n_{\beta+1}}\right| < \left|\frac{n_\alpha - n_{\alpha+1}}{n_\alpha + n_{\alpha+1}}\right|,$$

where $n_\alpha$ is a refractive index at a position at which the optical thickness of the graded layer is $\lambda/4$ when viewed from the substrate side, $n_{\alpha+1}$ is a refractive index at a position next to the position of $n_\alpha$, $n_\beta$ is a refractive index at a position at which the optical thickness of the graded layer is $3\lambda/4$ when viewed from the substrate side, and $n_{\beta+1}$ is a refractive index at a position next to the position of $n_\beta$.

In the above aspect, the graded layer may be formed of a microstructure layer that uses a microstructure smaller than a usable wavelength $\lambda$.

In the above aspect, the microstructure layer may be fabricated by changing a property of a homogeneous film through chemical treatment.

In the above aspect, a refractive index $n_b$ of the graded layer at a position closest to the substrate and a refractive index $n_s$ of the substrate may satisfy a condition in the following expression, $$0.001 < |n_s - n_b| < 0.2.$$

In the above aspect, the usable wavelength range may be from 400 to 700 nm.

In the above aspect, a condition in the following expression may be satisfied, $$0.85 < \frac{2n}{n_t + n_b} < 0.95,$$

where $n_b$ is a refractive index of the graded layer at a position closest to the substrate, $n_t$ is a refractive index of the graded layer at a position farthest from the substrate, and n is a refractive index of the graded layer at the center of the optical thickness.

In the above aspect, the antireflection film may be formed of only the graded layer.

In the above aspect, at least a single layer of a thin film may be formed between the graded layer and the substrate.

An optical system according to another aspect of the present invention includes the optical element according to the above aspect.

An optical apparatus according to still another aspect of the present invention includes the optical system according to the above aspect.

An optical element according to yet another aspect of the present invention includes an antireflection film. The antireflection film is a graded layer having a refractive index that is progressively decreased from the substrate side towards an outer surface of the antireflection film. The graded layer has a reflectivity characteristic occupying ⅔ of a usable wavelength range around the center of the usable wavelength range. Reflectivity of the graded layer at a maximum value of the reflectivity characteristic is a peak value equal to or less than 0.4%. At least one of reflectivities at both ends of the usable wavelength range is equal to or less than half the reflectivity at the peak value.

Further features of the present invention will become apparent from the following description of exemplary embodiments with reference to the attached drawings.

DESCRIPTION OF THE EMBODIMENTS

Embodiments of the present invention will be described below in detail with reference to the attached drawings. Here, a usable wavelength range is, for example, the visible range (wavelengths from 400 to 700 nm) for the convenience of description. However, the present invention is not limited thereto.

First Embodiment

Figure 1:
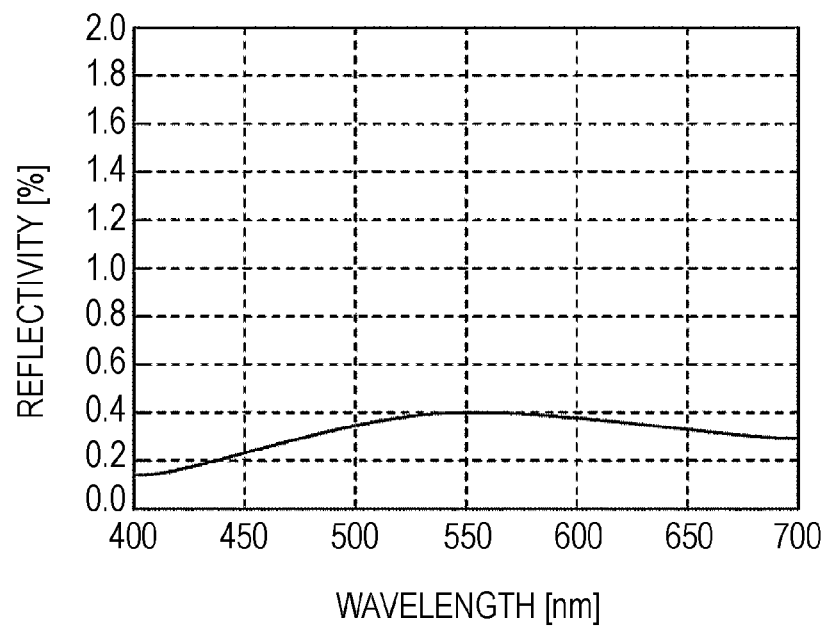
FIG. 1 illustrates reflectivity characteristics of an optical element according to a first embodiment of the present invention.

FIG. 1 illustrates reflectivity characteristics of an optical element provided with a thin film according to a first embodiment of the present invention. The horizontal axis plots wavelengths and the vertical axis plots reflectivities. Regarding the reflectivity characteristics of the optical element, a peak value of the reflectivity is located at a wavelength of 550 nm. The reflectivity at the peak value is 0.40%. Reflectivities with wavelengths of 400 nm and 700 nm at both ends of the usable wavelength range are respectively 0.15% and 0.28%.

Figure 2:
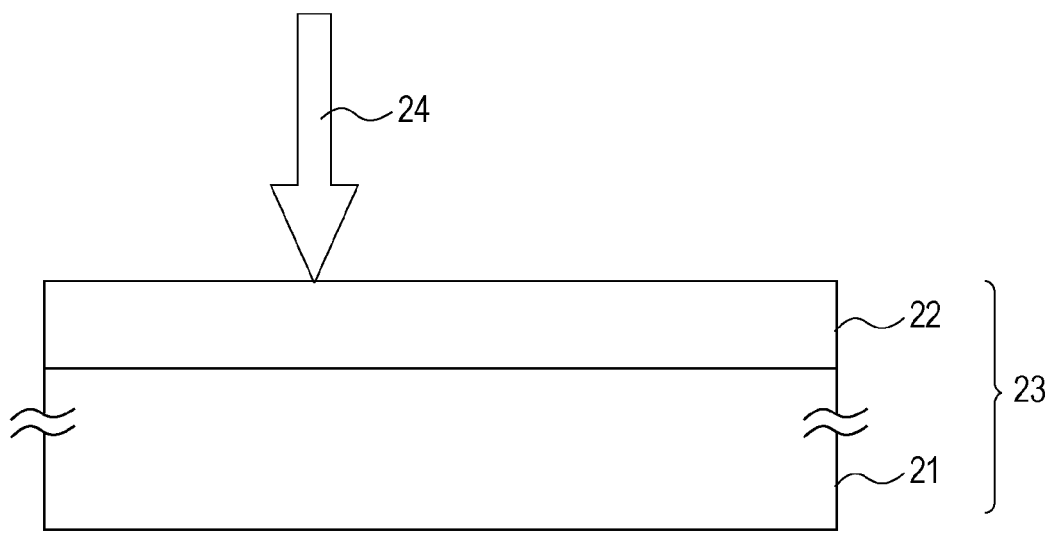
FIG. 2 is a cross-sectional view schematically showing an optical element provided with a thin film.

This embodiment illustrates a graded layer having a reflectivity that is gradually (i.e. continuously or progressively) decreased from the substrate side towards an outer surface of the graded layer. FIG. 2 illustrates an example of an optical structure provided with a thin film on a surface of a substrate. Reference numeral 21 denotes a substrate, 22 denotes a thin film, 23 denotes an optical element, and 24 denotes incident light. When the incident light 24 is incident on the optical element 23, the incident light 24 typically behaves in a different manner depending on the optical characteristics of the thin film 22.

Figure 3:
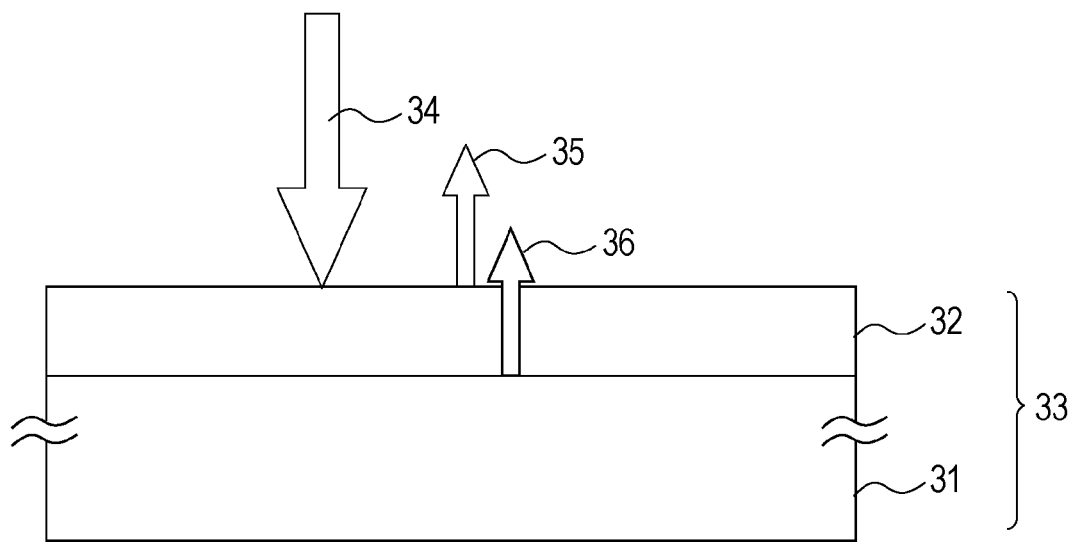
FIG. 3 is a cross-sectional view schematically showing an optical element provided with an antireflection film that has a homogeneous refractive index.

For example, FIG. 3 illustrates a light reflection state when the thin film 22 is a thin film having a uniform refractive index. Reference numeral 31 denotes a substrate, 32 denotes a thin film having a homogeneous refractive index, 33 denotes an optical element, 34 denotes incident light, 35 denotes light that is reflected by the outer surface of the thin film 32, and 36 denotes light that is reflected by the interface between the thin film 32 and the substrate 31. With this thin film 32, the incident light 34 is reflected by the interface. The reflectivity characteristics are determined on the basis of the interference between the light 35 and the light 36. To cause the light 35 and the light 36 to interfere with one another and to cancel one another, the thin film 32 has to have an optical film thickness that is an integral multiple of λ/4.

Figure 4:
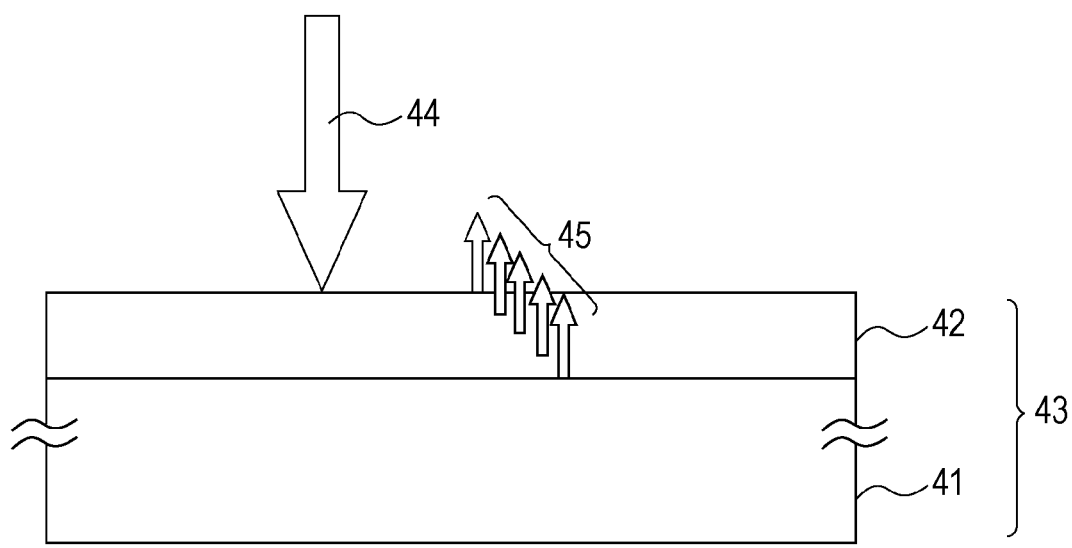
FIG. 4 is a cross-sectional view schematically showing an optical element provided with a graded layer.

In contrast, FIG. 4 illustrates a light reflection state when the thin film 22 of FIG. 2 is a graded layer having a refractive index that is progressively decreased in a thickness direction. Reference numeral 41 denotes a substrate, 42 denotes a graded layer having a refractive index that is progressively decreased in the thickness direction from the substrate 41 towards the outer surface of the graded layer 42, 43 denotes an optical element, 44 denotes incident light, and 45 denotes light that is reflected in the graded layer 42. With this graded layer 42, the incident light 44 is reflected and becomes many rays of reflected light 45 in accordance with a change in refractive index in the graded layer 42. The many rays of reflected light 45 interfere with one another, and hence, reflectivity characteristics are determined in accordance with the interference of the many rays of reflected light 45. To cause all of the many rays of reflected light 45 to interfere with one another and to cancel one another, the graded layer 42 has to have an optical film thickness that is an integral multiple of λ/2.

Figure 5:
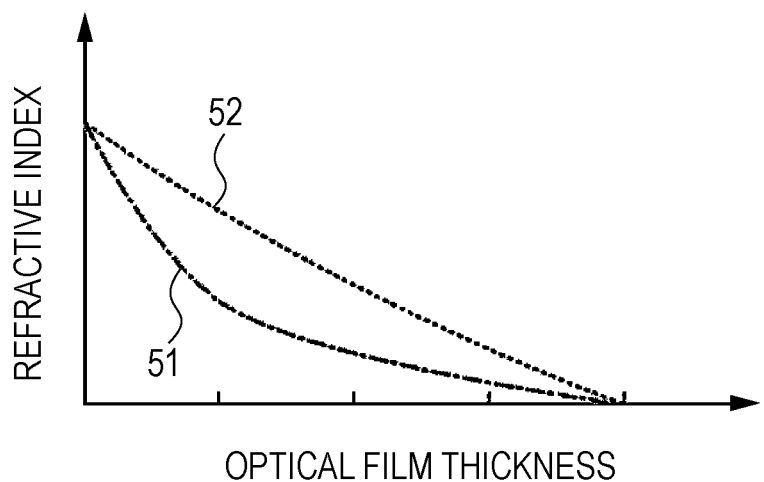
FIG. 5 illustrates an ideal refractive index gradient and a refractive index gradient of this embodiment when a graded layer is used as an antireflection film.

However, the interference appears in the graded layer 42 with the optical film thickness of λ/2 only when the change in refractive index in the graded layer 42 is ideal. FIG. 5 illustrates a refractive index gradient for optical film thicknesses of the graded layer 42 of FIG. 4. In FIG. 5, the left side (i.e., negative side) of the horizontal axis corresponds to the substrate side. As illustrated in FIG. 5, it can be appreciated that the refractive index of the graded layer 42 is gradually decreased from the substrate side in the thickness direction towards the outer surface of the graded layer. Reference numeral 51 denotes an example of a refractive index gradient of this embodiment, and 52 denotes an ideal refractive index gradient. The refractive index gradient 52 satisfies conditions as follows:

$$A_i = \frac{n_i - n_{i+1}}{n_i + n_{i+1}}, A_i = \text{constant, and} \quad (1)$$

$$n_i \cdot t_i = \text{constant,} \quad (2)$$

where $n_i$ is a refractive index of the graded layer 42 at a desirable point i, and $n_{i+1}$ is a refractive index of the graded layer 42 at a point i+1 located next to the desirable point i, and $t_i$ is a physical film thickness of the graded layer 42 at the desirable point i. Expression (1) features that $A_i$ that is obtained from $n_i$ and $n_{i+1}$ is constant at any desirable point i in the graded layer 42. Accordingly, the amplitudes of the rays of reflected light 45 that are reflected in the graded layer 42 are constant. Expression (2) features that the optical film thickness is constant at any desirable point i in the graded layer 42. Accordingly, the interfering phases of the rays of reflected light 45 that are reflected in the graded layer 42 are aligned with one another. The refractive index gradient 52 indicative of this state is not a straight line with respect to the optical film thickness, but is a curve like an arc. If the refractive index gradient 52 satisfies Expressions (1) and (2), and the total optical film thickness of the graded layer 42 satisfies the condition of λ/2, the rays of reflected light 45 can completely interfere with one another and cancel each other out in the graded layer 42.

However, to actually attain such a refractive index gradient 52, a film having an extremely finely controlled refractive index has to be fabricated. Also, the film has to take into account the total optical film thickness. Fabricating such a film needs an extremely fine technique, and hence mass productivity is poor.

Figure 6:
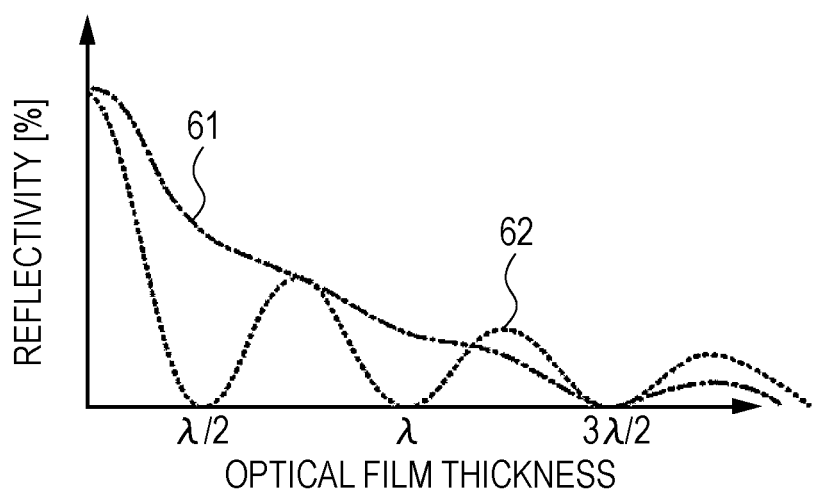
FIG. 6 schematically illustrates reflectivities to optical film thicknesses for respective refractive index gradients.

In contrast, regarding the refractive index gradient 51 that is deviated from the ideal refractive index gradient 52 upon fabrication, the rays of reflected light 45 do not completely interfere with one another and do not cancel with each other when the optical film thickness is λ/2. FIG. 6 schematically illustrates reflectivities with respect to optical film thicknesses for respective refractive index gradients. Reference numeral 61 denotes a reflectivity corresponding to the refractive index gradient 51 (shown in FIG. 5), and 62 denotes a reflectivity corresponding to the refractive index gradient 52. The reflectivity 62 of the refractive index gradient 52 shows ideal interference such that the reflectivity becomes zero when the optical film thickness is an integral multiple of λ/2. Also, it is found that the reflectivity is entirely decreased as the optical film thickness is increased. In contrast, since the reflectivity 61 of the refractive index gradient 51 does not correspond to a refractive index gradient of an optimal value, the reflectivity does not become zero at the position of λ/2. Also, the reflectivity is progressively and entirely decreased as the optical film thickness is increased. When the optical film thickness is increased, the rays of reflected light 45 are decreased. This effect becomes larger than that the rays of reflected light 45 cancel one another with a film thickness for ideal interference.

Figure 7:
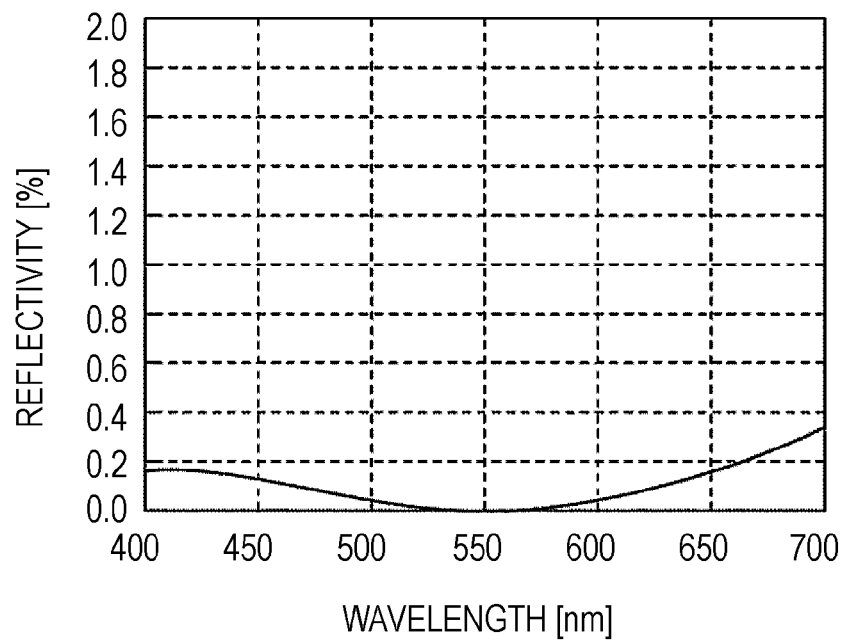
FIG. 7 illustrates reflectivity characteristics when a graded layer that has the ideal refractive index gradient for an optical film thickness of $\lambda/2$ is formed.
Figure 8:
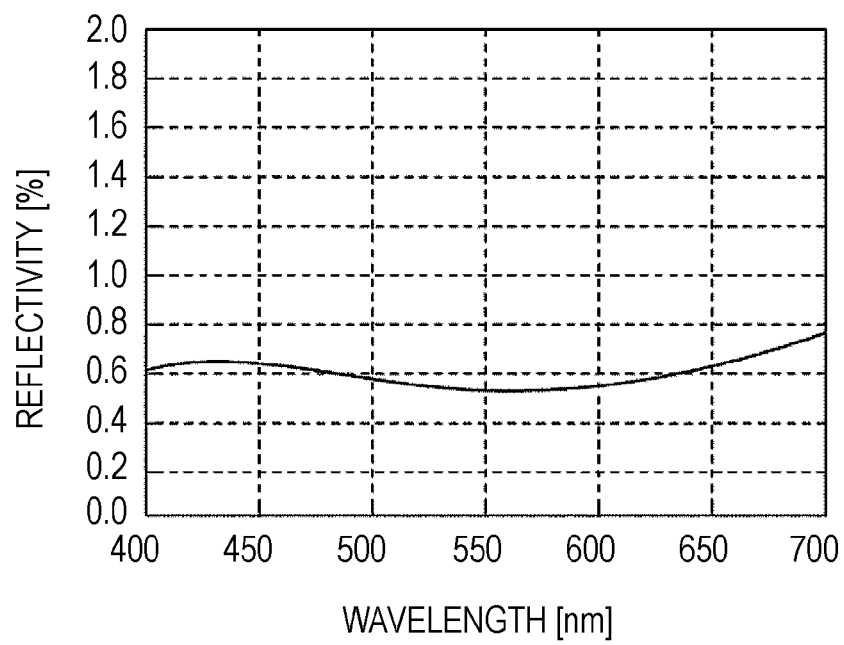
FIG. 8 illustrates reflectivity characteristics when a graded layer that has the refractive index gradient of this embodiment for an optical film thickness of $\lambda/2$ is formed.

FIG. 7 illustrates reflectivity characteristics with respect to wavelengths of the refractive index gradient 52 when the optical film thickness is λ/2. The substrate is optical glass with a refractive index of 1.583 for the d-line. It is assumed that the refractive index of the graded layer 42 varies from 1.58 to 1.0. When the refractive index gradient 52 is optimal, the characteristic is that the reflectivity becomes zero when the wavelength is 550 nm. In contrast, FIG. 8 illustrates reflectivity characteristics with respect to wavelengths of the refractive index gradient 51 when the optical film thickness is λ/2. Since the refractive index gradient 51 is not optimal, the reflectivity with the wavelength of 550 nm for interference is not completely decreased.

Figure 9:
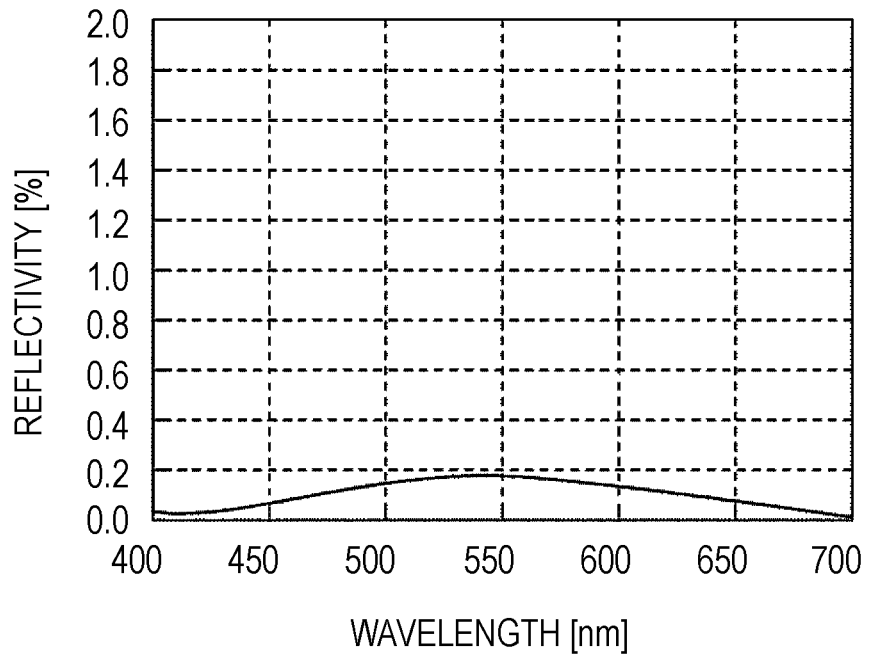
FIG. 9 illustrates reflectivity characteristics when a graded layer that has the ideal refractive index gradient for an optical film thickness of $3\lambda/4$ is formed.

Further, FIG. 9 illustrates reflectivity characteristics with respect to wavelengths of the refractive index gradient 52 when the optical film thickness is 3λ/4. The refractive index gradient is optimal; however, the film thickness for interference is not optimal. Hence, the characteristic has a peak when the wavelength is 550 nm. Further, FIG. 1 illustrates reflectivity characteristics with respect to wavelengths of the refractive index gradient 51 when the optical film thickness is 3λ/4. Similar to FIG. 9, the characteristic is that the reflectivity has a peak when the wavelength is 550 nm. However, the reflectivity is entirely decreased as compared with FIG. 8. As described above, when the refractive index gradient is not optimal, increasing the optical film thickness is more effective.

When the refractive index gradient is not optimal, it is desirable to increase the optical film thickness as much as possible. Meanwhile, it is difficult to increase the optical film thickness of the graded layer 42 in the viewpoint of fabrication. When the graded layer is fabricated, a film, the refractive index of which gradually varies, has to be fabricated. The situation is different from that of the thin film 32 having a homogeneous refractive index. The above film has to be formed by film deposition while the variation in refractive index is adjusted. Increasing the thickness of such a film should be avoided because fabrication time may be increased and fine adjustment for film deposition may be needed.

Thus, in this embodiment, a maximal value that is a peak value, at which a reflectivity is 0.4% or lower, is provided within a range occupying ⅔ of a usable wavelength range around the center of the usable wavelength range. The range occupying ⅔ of the usable wavelength range around the center of the usable wavelength range defines a range in which ⅓ of the usable wavelength range extends to either side from the center of the usable wavelength range. For example, if the usable wavelength range is from 400 to 700 nm (i.e., the visible range), the range occupying ⅔ of the usable wavelength range is from 450 to 650 nm. To fabricate an antireflection film, the film thickness for interference is typically arranged at the center. However, when the graded layer 42 with the above-described refractive index gradient 51 is used, the reflectivity is not completely decreased by the effect of the film thickness for interference. Hence, although it is not desirable in the viewpoint of interference, the film thickness of the graded layer 42 may be increased to have an optical film thickness that provides a reflectivity characteristic with a peak around the center of the usable wavelength range.

Also, the characteristic is obtained that a peak appears around the center of the usable wavelength range even when the optical film thickness is $\lambda/4$. Referring back to FIG. 6, the reflectivity with the optical film thickness of $\lambda/4$ is higher than the reflectivity with the optical film thickness for interference of $\lambda/2$. This is not desirable. Regarding the reflectivity, the film thickness is desirably larger than the film thickness of $\lambda/2$ that is optimal for interference. If this condition is satisfied, the reflectivity at the peak becomes 0.4% or lower.

In this embodiment, the graded layer does not have a maximal value not corresponding to the peak value within the usable wavelength range. The graded layer 42 having the characteristic that a plurality of maximal values are arranged in the usable wavelength range has a sufficiently large film thickness. The graded layer 42 with such a film thickness has a great effect resulted from increasing the optical film thickness. Thus, it is not necessary to consider the degree of interference. A particular problem does not occur in this embodiment.

In this embodiment, at least one of reflectivities at both ends of the usable wavelength range is no more than half a reflectivity at the peak value. The above phenomenon that at least one of the reflectivities at both ends of the usable wavelength is half the reflectivity at the peak represents that the effect of interference is greater than the effect of the film thickness. Since the effect of interference is greater, the reflectivity at an end of the usable wavelength range can be decreased to no more than half of the peak reflectivity. Accordingly, the reflectivity at a peak value can be suppressed in a wide range.

Also, in this embodiment, an optical thickness d of the graded layer 42 satisfies Expression (3) as follows:

$$\frac{(2m+1)-0.25}{4}\lambda < d < \frac{(2m+1)+0.30}{4}\lambda \quad (3)$$

(*m* is natural number).

This indicates that the optical thickness d is not an integral multiple of $\lambda/2$ which is most optimal for interference in the graded layer 42, but the optical thickness d satisfies the condition of $(2m-1)\cdot\lambda/4$ which is worst for interference. However, since the thickness of $\lambda/4$ is smaller than the thickness of $\lambda/2$, the advantage of this embodiment may not be provided. The range of d is more effective when the thickness is large rather than a small thickness. Thus, a range to the upper limit is wide. The lower limit is preferably −0.2 or higher, and more preferably −0.18 or higher. The upper limit is preferably 0.25 or lower, and more preferably 0.20 or lower.

In the configuration in FIG. 1 according to this embodiment, the optical film thickness is $3\lambda/4$, and hence satisfies Expression (3).

Also, in this embodiment, the refractive index gradient 51 of the graded layer satisfies a condition in Expression (4) as follows:

$$\left|\frac{n_\beta - n_{\beta+1}}{n_\beta + n_{\beta+1}}\right| < \left|\frac{n_\alpha - n_{\alpha+1}}{n_\alpha + n_{\alpha+1}}\right|, \quad (4)$$

where $n_\alpha$ is a refractive index at a position at which the optical thickness of the graded layer is ¼ when viewed from the substrate side, $n_{\alpha+1}$ is a refractive index at a position next to the position of $n_\alpha$, $n_\beta$ is a refractive index at a position at which the optical thickness of the graded layer is ¾ when viewed from the substrate side, and $n_{\beta+1}$ is a refractive index at a position next to the position of $n_\beta$.

Figure 10:
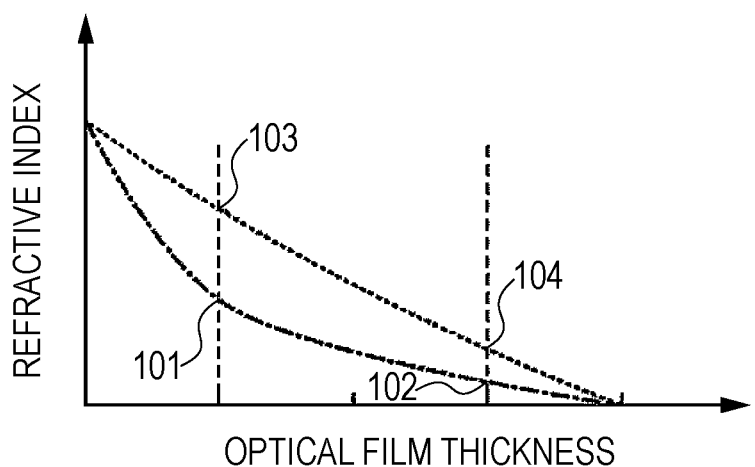
FIG. 10 schematically illustrates refractive index gradients.

FIG. 10 illustrates images of $n_\alpha$ and $n_\beta$. FIG. 10 refers to FIG. 5. A dotted-chain line corresponds to the refractive index gradient 51, and a broken line corresponds to the refractive index gradient 52. Reference numeral 101 denotes $n_\alpha$ of the refractive index gradient 51, 102 denotes $n_\beta$ of the refractive index gradient 51, 103 denotes $n_\alpha$ of the refractive index gradient 52, 104 denotes $n_\beta$ of the refractive index gradient 52. The optical thickness of ¼ when viewed from the substrate side represents the positions of 101 and 103. The optical thickness of ¾ when viewed from the substrate side represents the positions of 102 and 104. Both sides in Expression (4) correspond to the value A represented by Expression (1). In the case of the ideal refractive index gradient 52, the value A is constant at any position. In contrast, Expression (4) indicates that the refractive index gradient decreases rapidly near the substrate side and the gradient decreases slower as it advances far from the substrate toward the opposite side like the refractive index gradient 51 shown in FIG. 5. In this manner, when the gradient is curved like an arc to the lower side with respect to the ideal refractive index gradient 52, the reflectivity is likely decreased by increasing the thickness. In contrast, even when the gradient is curved like an arc to the upper side with respect to the refractive index gradient 52, the reflectivity can be decreased by increasing the thickness. However, the effect is small.

The refractive index gradient 51 in this embodiment is curved like an arc to the lower side with respect to the ideal refractive index gradient 52. Thus, Expression (4) is satisfied.

Second Embodiment

Figure 13:
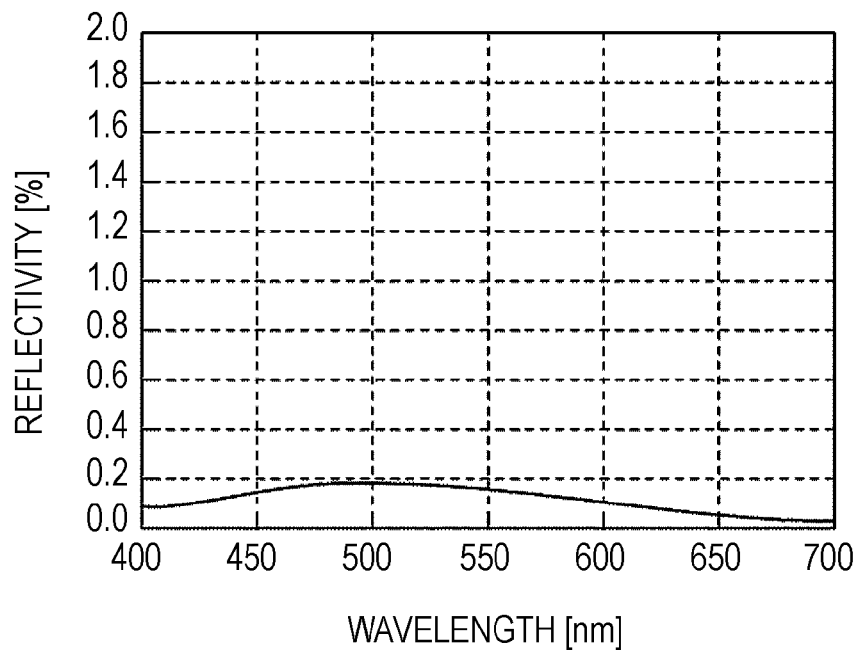
FIG. 13 illustrates reflectivity characteristics of an optical element according to a second embodiment.

FIG. 13 illustrates reflectivity characteristics according to a second embodiment of the present invention. The horizontal axis plots wavelengths and the vertical axis plots reflectivities. Regarding the characteristics, a peak value of the reflectivity is located at a wavelength of 500 nm. The reflectivity at the peak value is 0.18%. Reflectivities with wavelengths of 400 nm and 700 nm at both ends of the usable wavelength range are respectively 0.06% and 0.03%. The values satisfy all the aforementioned conditions (1) to (4).

Figure 12:
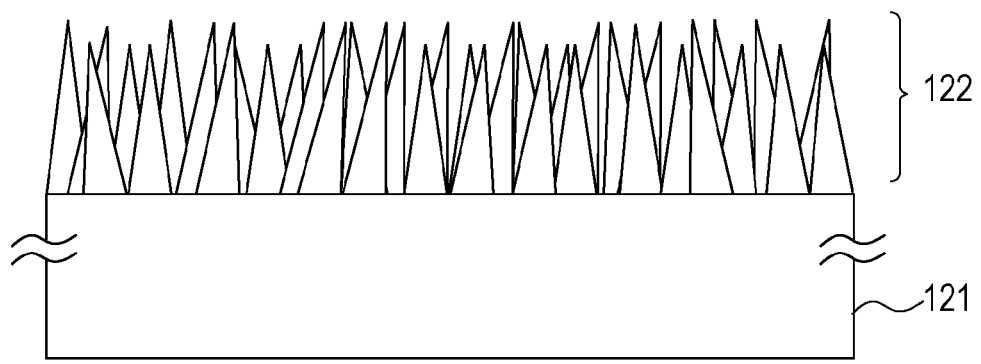
FIG. 12 illustrates an example of a graded layer having a structure that is smaller than the wavelength of light.
Figure 14:
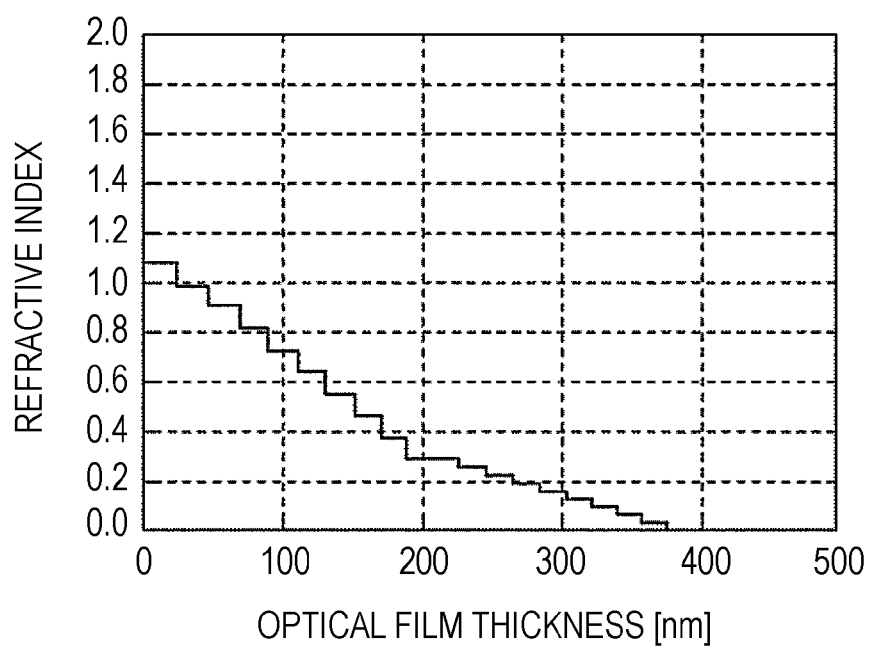
FIG. 14 illustrates reflectivity characteristics of an optical element according to the second embodiment.

The configuration of the second embodiment is shown in FIG. 12. Reference numeral 121 denotes a substrate, and 122 denotes a petaloid structure layer formed of a structure that is smaller than the wavelength of light to be used. The refractive index gradient of the structure layer is shown in FIG. 14. The substrate is a glass member with a refractive index of 1.583 for the d-line. Regarding the refractive index gradient, it is found that the refractive index is gradually decreased from the substrate side. The refractive index gradient satisfies Expression (4).

In this embodiment, the graded layer 42 (shown in FIG. 4) is formed of a microstructure layer that uses a structure smaller than the wavelength of light to be used.

Figure 11:
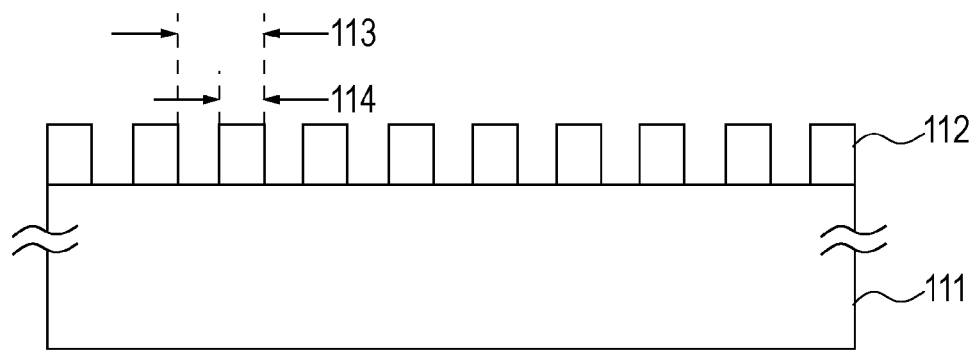
FIG. 11 illustrates an example of a structure that is smaller than the wavelength of light.

To attain the graded layer with the microstructure, the structure has to be adjusted. FIG. 11 schematically illustrates an example of an antireflection structure to briefly explain the behavior in the microstructure. Reference numeral 111 denotes a substrate, 112 denotes an antireflection structure member, 113 denotes a pitch between structure portions of the antireflection structure member 112, and 114 denotes a structure portion of the antireflection structure member 112.

The antireflection structure member 112 has a pitch 113 that is smaller than the usable wavelength. In such a structure, light behaves as if the antireflection structure member 112 is a homogeneous film. In the antireflection structure member 112, a characteristic based on a volume ratio of a material that forms the structure portions is exhibited. For example, in the case of the configuration in FIG. 11, an equivalent refractive index neff of the antireflection structure member 112 is simply obtained by using a refractive index $n_s$ of the structure portion 114 and a volume ratio ff of the structure portion 114 through Expression (5) as follows:

$$neff = ff \cdot n_s + (1-ff) \qquad (5).$$

The volume ratio ff can be obtained by {(structure portion 114)/(pitch 113 between structure portions)}. By properly selecting the volume ratio ff, the equivalent refractive index neff exhibits a behavior with a low refractive index. A film with a lowest refractive index from among typically used thin film materials is a film made of magnesium fluoride. The film has a refractive index of about 1.38 in the visible range. If an antireflection structure member 112 with a refractive index that is lower than the aforementioned refractive index is used as an antireflection film, markedly high antireflection performance, which cannot be provided by an existing film, can be obtained.

Here, the antireflection structure member 112 with a periodic structure has been described as an example for simplicity of description. However, the structure is not limited thereto. The antireflection structure member 112 may have a non-periodic structure as long as the pitch 113 between structure portions is smaller than the wavelength of light to be used.

In this embodiment, the graded film is used. Owing to this, when the microstructure is used as the graded layer, the structure is desirable that the volume ratio ff in Expression (5) varies in accordance with the thickness. An example of the microstructure in which the volume ratio ff varies in the thickness direction is shown in FIG. 12. In FIG. 12, the antireflection structure member 112 does not have a periodic structure, but has a random structure. The antireflection structure member 112 behaves like a material having an equivalent refractive index neff obtained from an average volume ratio ff. In the case of the structure layer 122, a volume ratio (filling factor) ff of the structure layer 122 at the incident side is smaller than a volume ratio (filling factor) ff of the structure layer 122 at a position closest to the substrate 121. Thus, the structure layer 122 behaves like a graded layer, the refractive index of which is gradually decreased from the substrate side.

In this embodiment, the structure layer 122 or the like is fabricated by changing the property of a homogeneous film through chemical treatment. There are provided some methods for fabricating a microstructure. For example, a microstructure may be fabricated by transferring a microstructure with a mold through nanoimprinting, or by etching through lithography with an electron beam and a photo mask. However, in such manufacturing methods, it is very difficult to control the thickness and the filling factor of a structure. Alternatively, for example, a petaloid film that is obtained by dipping a film made of aluminum oxide in hot water at temperatures from 60 to 100 degrees for at least 10 minutes. With this method, the film may be fabricated by a typical method in a controlled manner, and the change in property in the post processing after the fabrication can be relatively easily controlled. Thus, the thickness can be easily controlled, which is an important point for this embodiment. Also, the fill rate of the microstructure can be changed depending on the method of chemical treatment. The microstructure that satisfies Expression (4) can be easily fabricated.

Also, in this embodiment, a refractive index $n_b$ of the graded layer 42 at a position closest to the substrate 41 and a refractive index $n_s$ of the substrate 41 satisfy the condition in Expression (6) as follows:

$$0.001 < |n_s - n_b| < 0.2 \qquad (6).$$

Expression (6) represents that the difference between the refractive indices of the graded layer 42 and the substrate 41 is decreased as much as possible. If the difference in refractive index is large, although the reflectivity of the graded layer 42 is decreased to a certain degree by the graded layer 42, reflection caused by the difference in refractive index between the graded layer 42 and the substrate 41 may become large. Thus, by satisfying the condition in Expression (6), the entire reflectivity can be suppressed.

The first and second embodiments satisfy the condition in Expression (6).

Also, this embodiment satisfies a condition in Expression (7) as follows:

$$0.85 < \frac{2n}{n_t + n_b} < 0.95, \qquad (7)$$

where $n_b$ is a refractive index of the graded layer 42 at a position closest to the substrate, $n_t$ is a refractive index of the graded layer 42 at a position farthest from the substrate, and n is a refractive index of the graded layer 42 at the center of the optical film thickness.

This expression represents a refractive index of the graded layer 42 at a middle position of the optical film thickness. When Expression (7) is satisfied, the reflectivity can be entirely decreased even if a peak value of the reflectivity is located around the center of the usable wavelength range. The range of Expression (7) is preferably from 0.86 to 0.93, and more preferably from 0.87 to 0.91. The value in Expression (7) is 0.94 according to the first embodiment, and the value in Expression (7) is 0.88 according to the second embodiment. Thus, both values satisfy the condition.

Also, in this embodiment, the antireflection film is formed of only the graded layer 42. Since the film is formed of only the graded layer 42, the effect of the reflectivity can be easily controlled only by the graded layer. Also, when the structure layer 122 (microstructure) provides antireflection, the entire graded layer can be formed of the structure layer 122. Thus, the production can be easily controlled.

Figure 15:
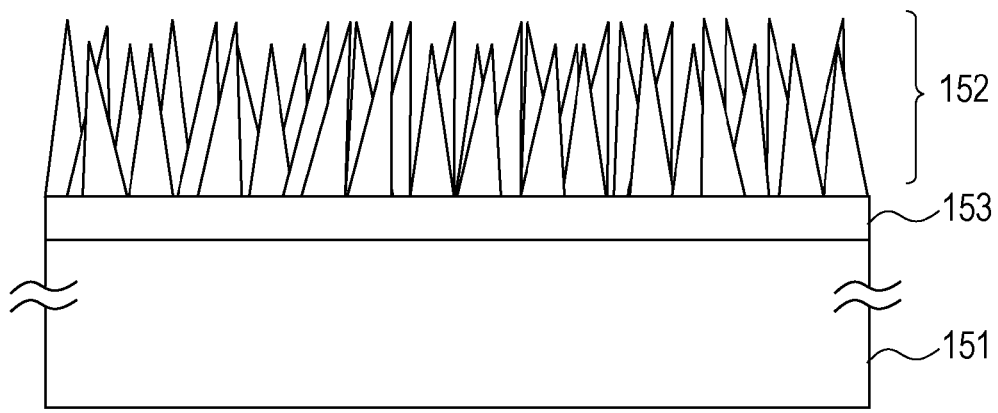
FIG. 15 illustrates an example of an optical element in which a microstructure and a thin film are combined.

Also, in this embodiment, at least a single layer of a thin film is inserted between the structure layer 122 (the graded layer) and the substrate 121. The structure is shown in FIG. 15. Reference numeral 151 denotes a substrate, 152 denotes a microstructure layer, and 153 denotes a thin film. The thin film 153 may have, for example, a function as an intermediate film that serves as an antireflection film between the microstructure layer 152 and the substrate 151, and a function as a protection film that protects the substrate 151.

Such optical elements with low reflectivities can be used for various optical apparatuses. For example, FIG. 16 illustrates a digital camera as an example of an optical apparatus using the optical element according to any of the above-described embodiments.

Figure 16:
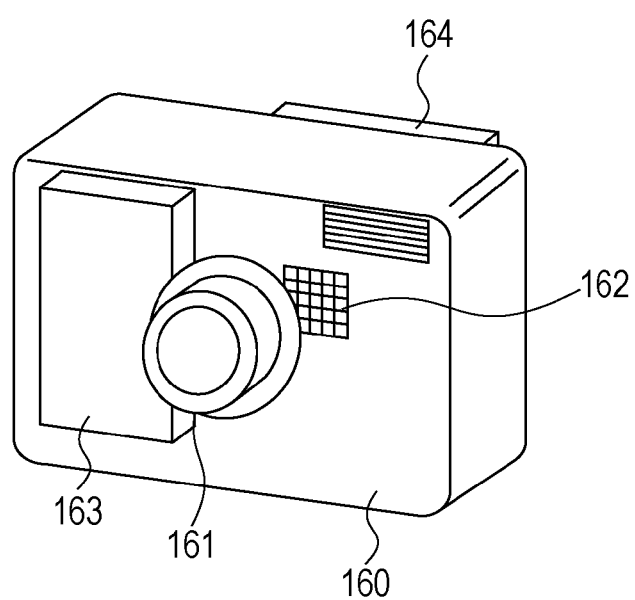
FIG. 16 illustrates a digital camera to which an optical element according to any of the embodiments of the present invention is applied.

In FIG. 16, reference numeral 160 denotes a camera body, and 161 denotes a photography optical system that uses the optical element. Reference numeral 162 denotes a solid state image pickup element (photoelectric conversion element), such as a CCD sensor or CMOS sensor, that receives an object image, the image being formed by the photography optical system 161.

Reference numeral 163 denotes a memory that stores information corresponding to the object image after the photoelectric conversion with the image pickup element 162, and 164 denotes an electronic view finder that is formed of a liquid crystal display panel or the like and that is used for observation of the object image formed on the solid state image pickup element 162.

By applying the optical element according to any of the above-described embodiments to the photography optical system or the like, a camera with a capacity for capturing a large quantity of light can be attained while unnecessary reflection is suppressed.

It is to be noted that the optical element according to any of the embodiments may be applied to, for example, an illumination optical system and a projection optical system of a liquid crystal projector. Accordingly, an optical apparatus including an optical system with a large quantity of light can be provided while unnecessary reflection is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123181 filed May 21, 2009, which is hereby incorporated by reference herein in its entirety.

What is claimed is:

1. An optical element comprising:
a substrate; and
an antireflection film provided on a surface of the substrate,
wherein the antireflection film is a graded layer having a refractive index that is progressively decreased from the substrate side towards an outer surface of the antireflection film,
wherein the graded layer has a reflectivity characteristic occupying ⅔ of a usable wavelength range around the center of the usable wavelength range,
wherein reflectivity of the graded layer at a maximum value of the reflectivity characteristic is a peak value equal to or less than 0.4%;
wherein the reflectivity characteristic of the optical element has only one peak value within the usable wavelength range,
wherein at least one of reflectivities at both ends of the usable wavelength range is equal to or less than half the reflectivity at the peak value,
wherein an optical thickness d of the graded layer satisfies a condition in the following expression, $$\frac{(2m+1)-0.25}{4}\lambda < d < \frac{(2m+1)+0.30}{4}\lambda,$$

where $\lambda$ is a usable wavelength located within the ⅔ of the usable wavelength range, and m is a natural number, and
wherein a refractive index gradient of the graded layer satisfies a condition in the following expression, $$\left|\frac{n_\beta - n_{\beta+1}}{n_\beta + n_{\beta+1}}\right| < \left|\frac{n_\alpha - n_{\alpha+1}}{n_\alpha + n_{\alpha+1}}\right|,$$

where $n_\alpha$ is a refractive index at a position at which the optical thickness d of the graded layer is d/4 when viewed from the substrate side, $n_{\alpha+1}$ is a refractive index at a position next to the position of $n_\alpha$, $n_\beta$ is a refractive index at a position at which the optical thickness of the graded layer is 3d/4 when viewed from the substrate side, and $n_{\beta+1}$ is a refractive index at a position next to the position of $n_\beta$.

2. The optical element according to claim 1, wherein the graded layer is formed of a microstructure layer that uses a smaller microstructure than a usable wavelength $\lambda$.

3. The optical element according to claim 1, wherein a refractive index $n_b$ of the graded layer at a position closest to the substrate and a refractive index $n_s$ of the substrate satisfy a condition in the following expression, $$0.001 < |n_s - n_b| < 0.2.$$

4. The optical element according to claim 1, wherein the usable wavelength range is from 400 to 700 nm.

5. The optical element according to claim 1,
wherein a condition in the following expression is satisfied, $$0.85 < \frac{2n}{n_t + n_b} < 0.95,$$

where $n_b$ is a refractive index of the graded layer at a position closest to the substrate, $n_t$ is a refractive index of the graded layer at a position farthest from the substrate, and n is a refractive index of the graded layer at the center of the optical thickness.

6. The optical element according to claim 1, wherein the antireflection film is formed of only the graded layer.

7. The optical element according to claim 1, wherein at least a single layer of a thin film is formed between the graded layer and the substrate.

8. An optical system comprising the optical element according to claim 1.

9. An optical apparatus comprising the optical system according to claim 8.

10. An optical element comprising:
an antireflection film,
wherein the antireflection film is a graded layer having a refractive index that is progressively decreased from the substrate side towards an outer surface of the antireflection film, wherein the graded layer has a reflectivity characteristic occupying ⅔ of a usable wavelength range around the center of the usable wavelength range, wherein reflectivity of the graded layer at a maximum value of the reflectivity characteristic is a peak value equal to or less than 0.4%, and wherein at least one of reflectivities at both ends of the usable wavelength range is equal to or less than half the reflectivity at the peak value, wherein an optical thickness d of the graded layer satisfies a condition in the following expression, $$\frac{(2m+1)-0.25}{4}\lambda < d < \frac{(2m+1)+0.30}{4}\lambda,$$

where $\lambda$ is a usable wavelength located within the ⅔ of the usable wavelength range, and m is a natural number, and wherein a refractive index gradient of the graded layer satisfies a condition in the following expression, $$\left|\frac{n_\beta - n_{\beta+1}}{n_\beta + n_{\beta+1}}\right| < \left|\frac{n_\alpha - n_{\alpha+1}}{n_\alpha + n_{\alpha+1}}\right|,$$

where $n_\alpha$ is a refractive index at a position at which the optical thickness d of the graded layer is d/4 when viewed from the substrate side, $n_{\alpha+1}$ is a refractive index at a position next to the position of $n_\alpha$, $n_\beta$ is a refractive index at a position at which the optical thickness of the graded layer is 3d/4 when viewed from the substrate side, and $n_{\beta+1}$ is a refractive index at a position next to the position of $n_\beta$.

* * * * *